(12) United States Patent
Valeriano et al.

(10) Patent No.: US 9,477,764 B2
(45) Date of Patent: Oct. 25, 2016

(54) METHODS AND SYSTEMS FOR EXTENDING A SOCIAL NETWORK WITH PRODUCT INFORMATION

(71) Applicant: Xerox Corporation, Norwalk, CT (US)

(72) Inventors: Francisco Marino Valeriano, Torrance, CA (US); Sharon Sadgat, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 366 days.

(21) Appl. No.: 13/856,079

(22) Filed: Apr. 3, 2013

(65) Prior Publication Data

US 2014/0304292 A1 Oct. 9, 2014

(51) Int. Cl.
*G06F 17/30* (2006.01)

(52) U.S. Cl.
CPC ... *G06F 17/30867* (2013.01); *G06F 17/30864* (2013.01)

(58) Field of Classification Search
CPC .............................................. G06F 17/30864
USPC ................................................ 707/722, 769
See application file for complete search history.

(56) References Cited

U.S. PATENT DOCUMENTS

| 7,818,336 B1* | 10/2010 | Amidon ............ G06F 17/30864 707/769 |
| 8,290,999 B2 | 10/2012 | Shepherd et al. |
| 2008/0189274 A1* | 8/2008 | Mann ................ G06F 17/30864 707/5 |
| 2009/0106307 A1* | 4/2009 | Spivack ................. G06Q 30/02 707/103 |
| 2012/0059848 A1* | 3/2012 | Krishnamoorthy .... G06Q 50/01 707/770 |
| 2012/0215848 A1* | 8/2012 | McCormick ........... G06Q 50/01 709/204 |
| 2014/0114956 A1* | 4/2014 | Bank ................... G06F 17/3064 707/722 |

* cited by examiner

*Primary Examiner* — Etienne Leroux
*Assistant Examiner* — Chelcie Daye
(74) *Attorney, Agent, or Firm* — Fox Rothschild LLP (57) ABSTRACT

A method of querying a social network associated with a user may include receiving, by a computing device, a query that includes an indication of a product, and an identifier associated with the user. The method may include executing, by the computing device, the query across the social network by sending the query to one or more agent applications associated with one or more members of the social network, and receiving a notification from one or more of the agent applications if a profile for a member of the social network indicates that the member is associated with the product, and a privacy policy associated with the member permits the agent to send the notification.

19 Claims, 4 Drawing Sheets

METHODS AND SYSTEMS FOR EXTENDING A SOCIAL NETWORK WITH PRODUCT INFORMATION

BACKGROUND

Performing a product-based query across a social network is often a tedious task that often yields inconsistent results. For example, a user may send a query in a free form message to the closest-linked people in the user's social network. However, this approach has a low probability of success. As another example, a user may use information in social network profiles to identify which contacts should receive a query. For instance, if a query relates to a particular kitchen appliance, a user might send the query to people who are interested in cooking. Again, this approach is very unreliable.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. Nothing in this document is to be construed as an admission that the embodiments described in this document are not entitled to antedate such disclosure by virtue of prior invention. As used herein, the term "comprising" means "including, but not limited to."

In an embodiment, a method of querying a social network associated with a user may include receiving, by a computing device, a query that includes an indication of a product, and an identifier associated with the user. The method may include executing, by the computing device, the query across the social network by sending the query to one or more agent applications associated with one or more members of the social network, and receiving a notification from one or more of the agent applications if a profile for a member of the social network indicates that the member is associated with the product, and a privacy policy associated with the member permits the agent to send the notification.

In an embodiment, a method of querying a social network associated with a user may include receiving a query by an agent application of a computing device. The agent application may be associated with a member of a social network, and the query may include an indication of a product, and an identifier associated with the user. The method may include comparing a profile associated with the member to the received query to determine whether the profile satisfies the query, and in response to the profile satisfying the query, determining whether a privacy policy associated with the member allows a notification to be sent to the querying service, and in response to the privacy policy allowing a notification to be sent to the querying service, sending a notification to the querying service comprising an indication that the member has the desired relationship.

In an embodiment, a system of querying a social network associated with a user may include a computing device and a computer-readable storage medium in communication with the computing device. The computer-readable storage medium may include one or more programming instructions that, when executed, cause the computing device to receive a query by an agent application of the computing device. The agent application may be associated with a member of a social network, and the query may include an indication of a product, and an identifier associated with the user. The computer-readable storage medium may include one or more programming instructions that, when executed, cause the computing device to compare a profile associated with the member to the received query to determine whether the profile satisfies the query, and in response to the profile satisfying the query, determine whether a privacy policy associated with the member allows a notification to be sent to the querying service, and in response to the privacy policy allowing a notification to be sent to the querying service, send a notification to the querying service comprising an indication that the member has the desired relationship.

DETAILED DESCRIPTION

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "social network" is a system that provides users who have defined relationships between one another, and who may be geographically separated from one another, the ability to interact with one another via a communications network. A social network may encompass different types of interactions such as friendship, family relationships, business networking, and the like. Users may interact with friends and existing contacts, or discover and interact with new friends and contacts via the social network.

Figure 1:
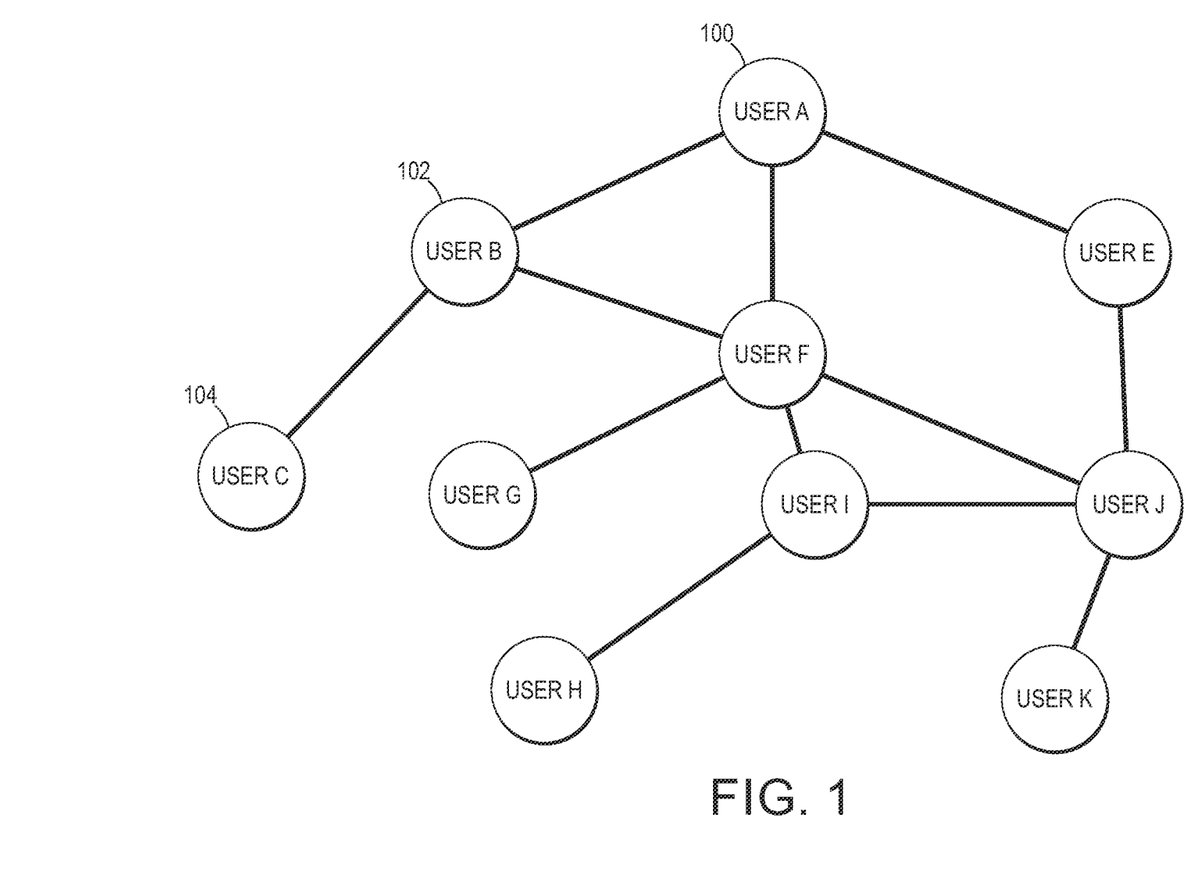
FIG. 1 illustrates an example social network according to an embodiment.

FIG. 1 illustrates an example social network according to an embodiment. As illustrated by FIG. 1, a user may have a certain number of degrees of separation from one or more contacts in the user's social network. For example, as illustrated by FIG. 1, User A 100 may have one degree of separation from User B 102, and two degrees of separation from User C 104. The social network will include one or more databases of user profiles. In an embodiment, each user of a social network may have an associated profile in the database(s). A profile may include information about a user, such as, for example, a name, contact information, hobbies, interests, and/or the like.

In an embodiment, a user may cause a social network to associate one or more products with the user's profile. A product may be associated with a profile by using a unique identifier associated with the product. Example identifiers may include, without limitation, a Universal Product Code (UPC), a portion of the Electronic Product Code (EPC) that identifies the product, such as the Global Trade Item Number (GTIN), a portion of a matrix code such as a QR® code, and/or the like.

In an embodiment, a user may cause the system to associate a product with the user's profile by manually providing information pertaining to the product. For example, a user may manually enter the product's UPC, EPC, GTIN and/or other unique identifier. In another embodiment, a user may be provided with a list of products, and a user may select a product to associate with the user's profile.

In an alternate embodiment, a user may cause the system to associate a product with the user's profile by taking a picture of a unique identifier associated with the product. For example, a user may use a computing device, such as, for example, a mobile phone to capture a digital image of a barcode of a product. Software on the computing device may identify a unique identifier, such as, for example the UPC, from the digital image.

In another embodiment, a user may cause the network to associate a product with the user's profile using a device having a near-field communications (NFC) receiver. For example, a user may use his or her mobile device that is equipped with an NFC receiver, such as a Bluetooth® or other NFC receiver, to associate a product with the user's profile. If the product has an NFC-readable device such as an radio frequency identification tag, a user may scan the product's RFID tag with an RFID reader to obtain unique identifying information associated with the product from the product's tag or other NFC device.

In an embodiment, a system may locate additional information about a product identified by a user. The system may include this additional information a user's profile. The additional information may include metadata associated with a product such as, for example, a manufacturer of the product, a product name, model number, make and/or the like. In an embodiment, the system may locate additional information about a product using one or more databases. For example, the system may use a unique identifier of a product to locate additional information about the product from one or more databases. Example databases may include, for example, UPC databases, EPC databases and/or the like. For instance, a computing device may capture a digital image of a barcode of a product. Software on the computing device may identify a UPC for the product. The computing device may provide the UPC to one or more databases, and may receive additional information about the product.

In an embodiment, a system may prompt a user to provide additional information about a product. For example, if a user manually provides information about a product, the system may prompt the user to provide additional information if the provided information is insufficient. In an embodiment, provided information may be insufficient if it does not identify a particular product or if it identifies more than one product. For example, a user may provide a make associated with a product. The system may prompt the user to more fully identify the product by providing a model and/or other information associated with the product.

In an embodiment, a user may cause a social network to associate one or more brands, product manufacturers and/or the like with the user's profile. For example, a user may be able to identify certain brands to associate with the user's profile, without specifically identifying a product associated with the brand.

In an embodiment, a user may cause a social network to associate a relationship between the user and a certain product. For example, a user may identify a relationship that the user has with a product. Such relationships may include, without limitation, that the user owns the product, the user has used the product, the user has access to the product, the user is able to provide information, feedback, reviews and/or the like about a product and/or the like. In an embodiment, a user may not associate a relationship with a product. In such a situation, a user may evaluate and determine whether to respond to a particular query based on the user's relationship and/or experience with the product.

In an embodiment, a user may establish one or more privacy settings associated with one or more products that the system may associate in the user's profile. A user's privacy setting may indicate whether a user is interested in being contacted about a product, whether the fact that a product is associated with a user's profile is available to be queried and/or the like.

In an embodiment, a user may specify a type of query to which an agent may respond. For example, a user may specify that only queries having a certain degree of specificity will be responded to. For instance, a user may prefer not to respond to general queries, such as, for example, a query for "computers." However, the user may agree to respond to specific queries that include a certain make and/or model of computer.

In an embodiment, a user may specify that only queries from people who are a certain degree of separation from the user should be responded to. For example, a user may prefer to receive only queries from people who are, at a maximum, two degrees of separation away from the user (i.e., friends of friends). If a user establishes this privacy setting, then a corresponding agent may block or refuse to respond to queries that originate from people who are more than the specified degree of separation away from the user. Additional and/or alternate privacy settings may be used within the scope of this disclosure.

In an embodiment, a user may ask the system to query a product across the user's social network. In an embodiment, a query may include an indication of a product. For example, a query may be a question pertaining to a particular product. Example queries may include a request for people in a user's network who own the product, have used the product, can provide feedback about the product and/or the like.

Figure 2:
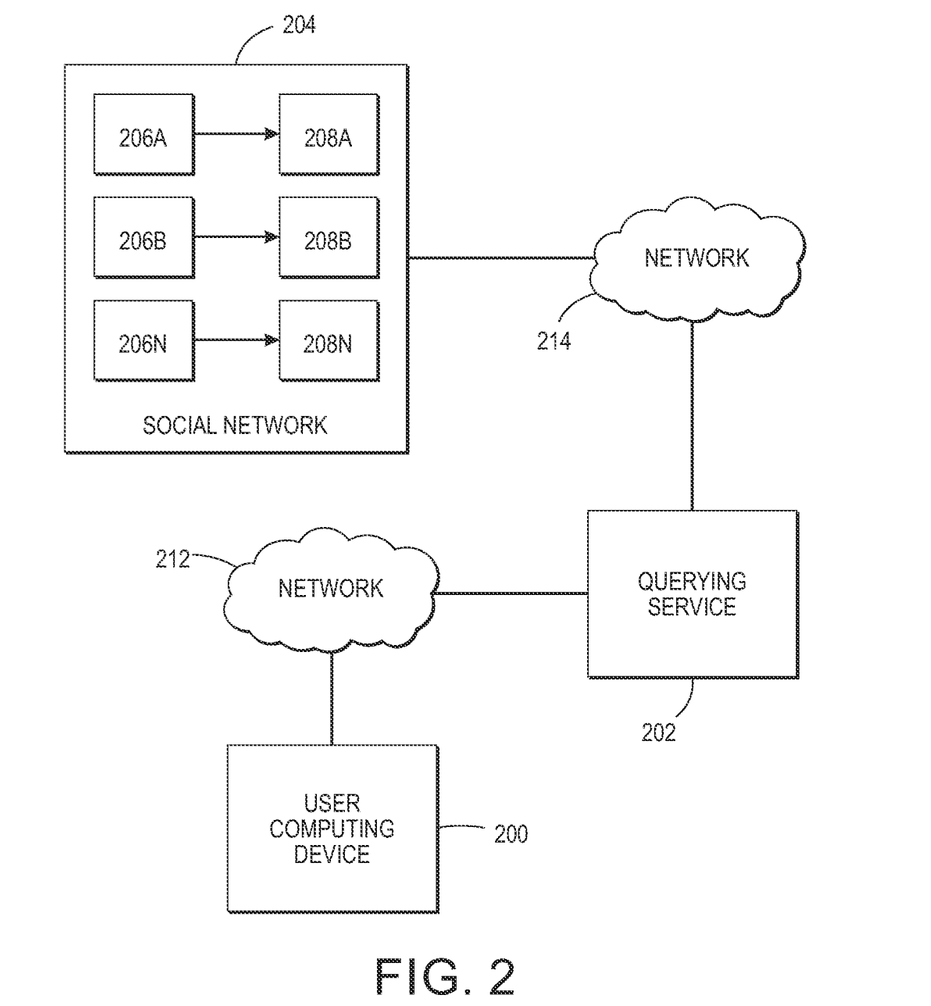
FIG. 2 illustrates an example system for querying a social network according to an embodiment.

FIG. 2 illustrates an example system for querying a social network according to an embodiment. As illustrated by FIG. 2, a system 210 may include a user computing device 200, a querying service 202 and a social network 204.

A user computing device 200 may be associated with a user who wants to query the user's social network. In an embodiment, a user computing device 200 may be in communication with a querying service 202. For example, a user computing device 200 may be in communication with a querying service 202 via a communication network 212. In various embodiments, the communication network 212 may be a local area network (LAN), a wide area network (WAN), a mobile or cellular communication network, an extranet, an intranet, the Internet and/or the like. In an embodiment, the communication network 212 may provide communication capability between a user computing device 200 and a querying service 202.

In an embodiment, a querying service 202 may communicate with a user computing device 200 and a social network 204. For example, a user computing device 200 may send a query to the querying service 202. The querying service 202 may query the social network 204 using the received query. In an embodiment, a querying service 202 may communicate with a social network 204 via a communication network 214. In various embodiments, the communication network 212 may be a LAN, a WAN, a mobile or cellular communication network, an extranet, an intranet, the Internet and/or the like. In an embodiment, the communication network 214 may provide communication capability between a querying service 202 and a social network 204.

In an embodiment, a querying service 202 may communicate with one or more agents 208a-N of a social network 204. An agent 208a-N may be a software application that manages queries for one or more social network users 206a-N. In an embodiment, an agent 208a-N may correspond to one social network user 206a-N. For example, referring to FIG. 2, each user 206a-N may be associated with its own agent 206a-N. In an alternate embodiment, an agent may correspond to more than one social network user.

Figure 3:
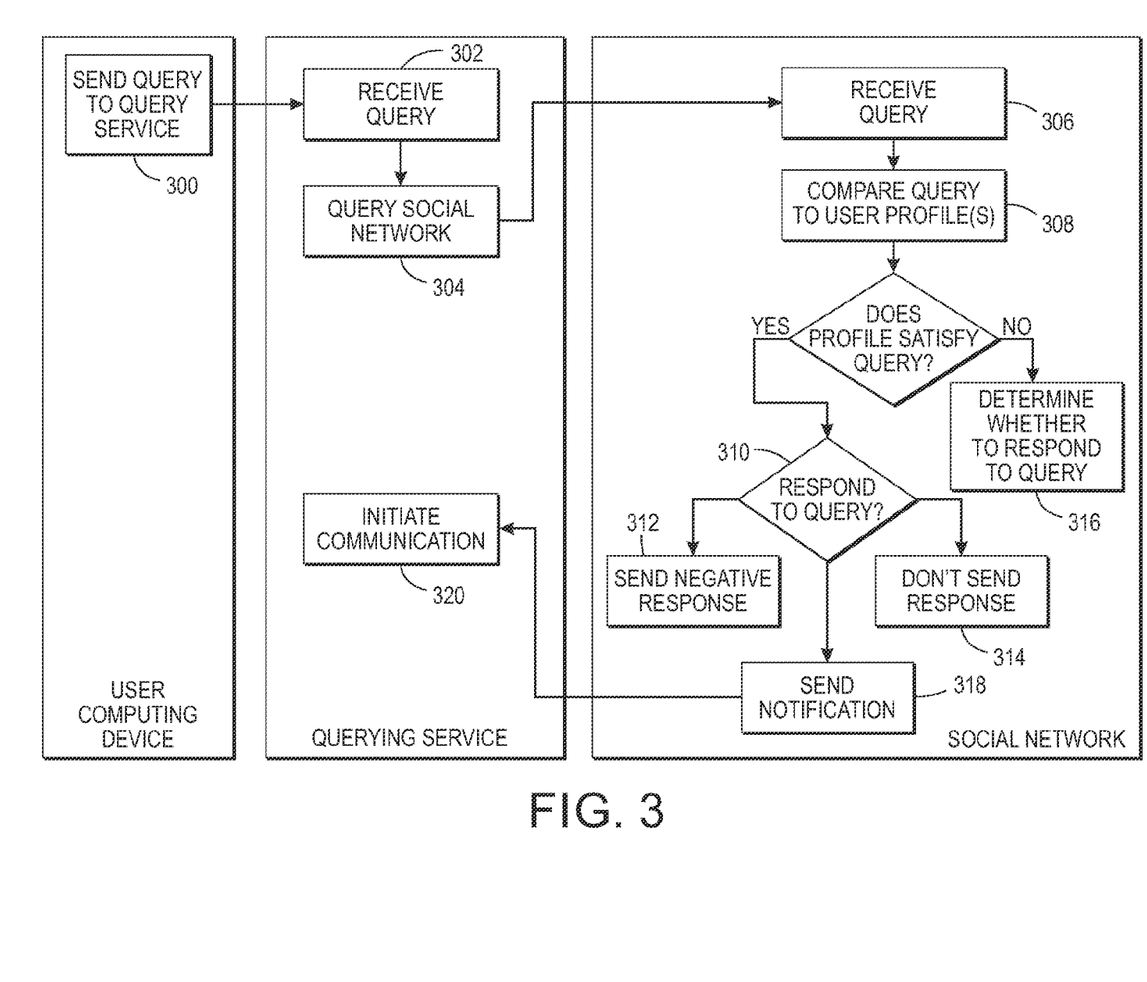
FIG. 3 illustrates a flowchart of an example method of querying a social network according to an embodiment.

FIG. 3 illustrates a flowchart of an example method of querying a social network according to an embodiment. As illustrated by FIG. 3, a user computing device may send 300 a query to a querying service. For example, a user may submit a query asking who in their social network has a certain experience with Product A.

In an embodiment, a query may include an indication of a product about which the query pertains, an indication of what information a querying user wants to receive, an identifier associated with the querying user, a relationship between a queried user and the querying user and/or the like. For example, User A may query his social network to find someone who owns Product A.

The query may include one or more identifiers associated with Product A, such as, for example, a name, make, model, description and/or the like of Product A. In an embodiment, the query may include a barcode, a UPC, EPC, GTIN or other unique identifier.

In an embodiment, the query may include an indication that User A wants to locate someone who owns Product A. The query may indicate a degree of separation between User A and a queried user. For example, the query may indicate that User A is a friend of friend of a queried user. In an embodiment, a query may identify User A. For example, the query may include User A's name, screen name, handle and/or the like.

The querying service may receive 302 a query, and may query 304 one or more agents of a social network using the received query. In an embodiment, the querying service may execute the query on a social network. For example, the querying service may send the query to one or more social network agents. The agents may receive 306 the query and may compare 308 the query to at least a portion of information associated with the corresponding user's profile. For example, using the above example, an agent may receive 306 the query regarding Product A and may compare 308 the query with a user profile to determine whether the user's profile includes information that encompasses Product A in any way. For example, a user's profile may indicate that the user owns Product A.

In an embodiment, an agent may use one or more databases to determine whether information in a user profile satisfies a query. In various embodiments, information about a product that is included in a query may not exactly correspond to information in a user's profile. An agent may use one or more product databases, such as a UPC database, an EPC database and/or other databases to determine whether a user profile satisfies a query. For example, a query may include a UPC associated with a pair of shoes, and a user profile may include the brand and name of the shoes, but not the UPC code. An agent may cross-reference information from the profile and the query to determine whether the profile satisfies the query. For instance, referring to the above example, an agent may query a database, such as a UPC database, using the UPC in the query. The agent may receive information pertaining to the product from the UPC database, such as, for example, a product name and manufacturer. The agent may compare this information to information in a user profile to determine whether the profile satisfies the query.

In an embodiment, a profile may satisfy a query if the queried information is a subset of the information in a user profile. For example, a query may identify a particular style of running shoe by a certain manufacturer. A user's profile may identify all running shoes by the manufacturer. In this example, the profile may satisfy the query because the queried information is a subset of the profile information. As another example, a user profile may include only a certain brand. As such, the profile may satisfy all queried products of the brand.

In an embodiment, if an agent determines that a user's profile satisfies a query, the agent may determine 310 whether to respond to the query. An agent may determine 310 whether to respond to a query based, at least in part, on a privacy policy associated with a user's profile. For example, a privacy policy associated with a user's profile may indicate that the user's agent is not to respond to any queries that it receives. In this case, even if the user has experience with the queried product, the agent may not respond to the query with this information. Rather, in an embodiment, an agent may respond 312 with a negative response to the query such as, for example, that no user was identified. In an alternate embodiment, an agent may not respond 314 at all in this situation.

As another example, a privacy policy associated with a user's profile may indicate that a user does not want to respond to queries involving one or more products. For example, a user may cause the system to associate the user's profile with Product A and Product B. The user may specify in the user's profile that the user is open to receiving queries regarding Product A but not Product B.

In an embodiment, if an agent determines that a user's profile does not satisfy a query, the agent may determine 316 whether to respond to the query. An agent may determine 316 whether to respond to a query based, at least in part, on a privacy policy associated with a user's profile. For example, a user's privacy policy may indicate that the user does not want to respond to any queries, regardless of whether the query is pertinent or not to the user. In such a situation, the agent may not respond to the query. In another embodiment, an agent may respond with an indication that the queried user does not satisfy the query.

In an embodiment, if a user's profile satisfies a query and a user's privacy policy indicates that the user may be contacted about such a query, the associated agent may send 318 a notification to the querying service. The querying service may initiate 320 communication between the querying user and the queried user. For example, a querying service may send each user contact information of the other user such as, for example, an email address, a phone number and/or the like. In an embodiment, a querying service may provide the querying user with an identifier associated with the queried user such as, for example, the queried user's name, screen name, handle and/or the like.

Figure 4:
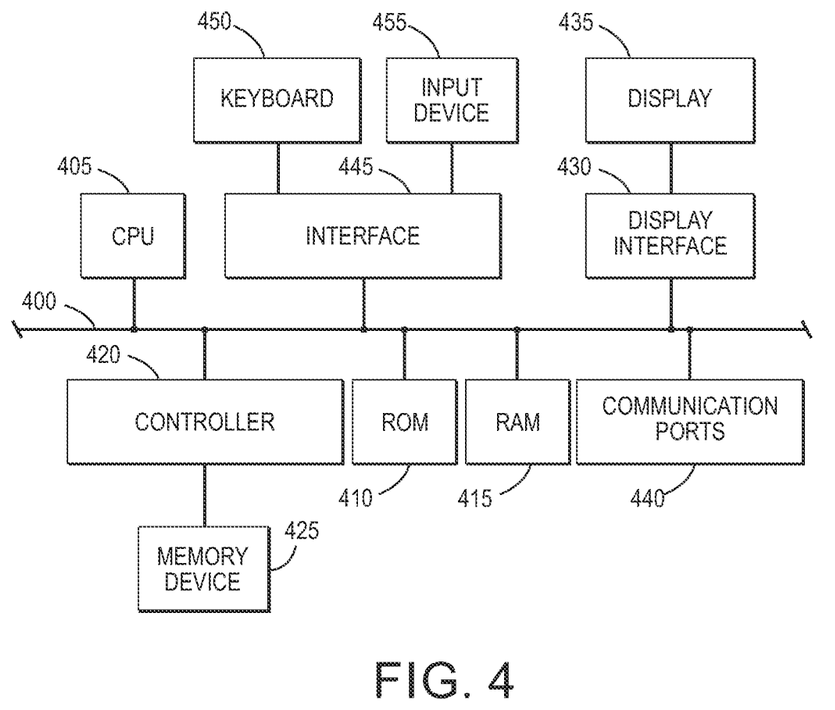
FIG. 4 depicts a block diagram of hardware that may be used to contain or implement program instructions.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of querying a social network associated with a querying user, the method comprising:
   receiving, by a computing device, a query comprising:
      an indication of a product,
      a degree of separation between the querying user and a member of the social network, wherein the degree of separation is a number of users between the querying user and a member of the social network, and
      an identifier associated with the querying user; and
   executing, by the computing device, the query across the social network by:
      sending the query to one or more agent applications associated with one or more members of the social network, wherein the one or more members of the social network are within the degree of separation specified by the querying user,
      receiving a notification from one or more of the agent applications if:
         a profile for a member of the social network indicates that the member is associated with the product, and
         a privacy policy associated with the member permits the agent to send the notification, wherein the privacy policy only permits responding to queries that have a pre-defined degree of specificity relating to information about the product.

2. The method of claim 1, wherein the indication of a product comprises one or more of the following:
   a name of the product;
   a make of the product;
   a model of the product; and
   a description of the product.

3. The method of claim 1, wherein receiving the query comprises receiving a query comprising an indication of a desired relationship between a member of the social network and the product.

4. The method of claim 1, wherein an identifier associated with the querying user comprises one or more of the following:
   a name of the querying user;
   a screen name of the querying user; and
   a handle associated with the querying user.

5. The method of claim 1, further comprising:
   in response to receiving the notification, initiating communication between the querying user and the member.

6. The method of claim 3, wherein the indication of a desired relationship between a member of the social network and the product comprises an indication of one or more of the following:
   ownership of the product;
   access to the product; and
   feedback about the product.

7. A method of querying a social network associated with a querying user, the method comprising:
   receiving a query by an agent application of a computing device, wherein the agent application is associated with a member of a social network, wherein the query comprises:
      an indication of a product,
      a first degree of separation between the querying user and a member of the social network, wherein the first degree of separation is a number of users between the querying user and a member of the social network, and
      an identifier associated with the querying user;
   comparing a profile associated with the member to the received query to determine whether the profile satisfies the query; and
   in response to the profile satisfying the query:
      determining whether a privacy policy associated with the member allows a notification to be sent to the querying service, wherein the privacy policy only permits responding to queries that have a pre-defined degree of specificity relating to information about the product, and
      in response to the privacy policy allowing a notification to be sent to the querying service, sending a notification to the querying service comprising an indication that the member has the desired relationship.

8. The method of claim 7, wherein comparing a profile associated with the member to the received query to determine whether the profile satisfies the query comprises:
using at least a portion of information in the query to access a product database;
receiving, from the product database, additional product information associated with the product; and
comparing at least a portion of the additional product information to the profile.

9. The method of claim 7, wherein determining whether a privacy policy associated with the member allows a notification to be sent to the querying service comprises:
determining whether the privacy policy prohibits responding to any queries;
in response to the privacy policy prohibiting responding to any queries, determining that the privacy policy does not allow the notification to be sent.

10. The method of claim 7, wherein determining whether a privacy policy associated with the member allows a notification to be sent to the querying service comprises:
determining whether the privacy policy prohibits responding to one or more queries pertaining to the product; and
in response to the privacy policy prohibiting responding to queries pertaining to the product, determining that the privacy policy does not allow the notification to be sent.

11. The method of claim 7, wherein determining whether a privacy policy associated with the member allows a notification to be sent to the querying service comprises:
determining whether the query has the pre-defined degree of specificity; and
in response to determining that the query does not have the pre-defined degree of specificity, determining that the privacy policy does not allow the notification to be sent.

12. The method of claim 7, wherein determining whether a privacy policy associated with the member allows a notification to be sent to the querying service comprises:
determining whether the querying user is within a second degree of separation from the member, wherein the second degree of separation is specified by the member; and
in response to determining that the querying user is not within the second degree of separation from the member, determining that the privacy policy does not allow the notification to be sent.

13. A system of querying a social network associated with a querying user, the system comprising:
a computing device; and
a computer-readable storage medium in communication with the computing device, wherein the computer-readable storage medium comprises one or more programming instructions that, when executed, cause the computing device to:
receive a query by an agent application of the computing device, wherein the agent application is associated with a member of a social network, wherein the query comprises:
an indication of a product,
a first degree of separation between the querying user and a member of the social network, wherein the first degree of separation is a number of users between the querying user and a member of the social network, and
an identifier associated with the querying user,
compare a profile associated with the member to the received query to determine whether the profile satisfies the query, and
in response to the profile satisfying the query:
determine whether a privacy policy associated with the member allows a notification to be sent to the querying service, wherein the privacy policy only permits responding to queries that have a pre-defined degree of specificity relating to information about the product, and
in response to the privacy policy allowing a notification to be sent to the querying service, send a notification to the querying service comprising an indication that the member has the desired relationship.

14. The system of claim 13, wherein the one or more programming instructions that, when executed, cause the computing device to compare a profile associated with the member to the received query to determine whether the profile satisfies the query comprise one or more programming instructions that, when executed, cause the computing device to:
use at least a portion of information in the query to access a product database;
receive, from the product database, additional product information associated with the product; and
compare at least a portion of the additional product information to the profile.

15. The system of claim 13, wherein the one or more programming instructions that, when executed, cause the computing device to determine whether a privacy policy associated with the member allows a notification to be sent to the querying service comprise one or more programming instructions that, when executed, cause the computing device to:
determine whether the privacy policy prohibits responding to any queries; and
in response to the privacy policy prohibiting responding to any queries, determine that the privacy policy does not allow the notification to be sent.

16. The system of claim 13, wherein the one or more programming instructions that, when executed, cause the computing device to determine whether a privacy policy associated with the member allows a notification to be sent to the querying service comprise one or more programming instructions that, when executed, cause the computing device to:
determine whether the privacy policy prohibits responding to one or more queries pertaining to the product; and
in response to the privacy policy prohibiting responding to queries pertaining to the product, determine that the privacy policy does not allow the notification to be sent.

17. The system of claim 13, wherein the one or more programming instructions that, when executed, cause the computing device to determine whether a privacy policy associated with the member allows a notification to be sent to the querying service comprise one or more programming instructions that, when executed, cause the computing device to:
determine whether the query has the pre-defined degree of specificity; and
in response to determining that the query does not have the pre-defined degree of specificity, determine that the privacy policy does not allow the notification to be sent.

18. The system of claim 13, wherein the one or more programming instructions that, when executed, cause the computing device to determine whether a privacy policy associated with the member allows a notification to be sent to the querying service comprise one or more programming instructions that, when executed, cause the computing device to:
- determining whether the user is within a second degree of separation from the member, wherein the second degree of separation is specified by the member; and
- in response to determining that the user is not within the second degree of separation from the member, determine that the privacy policy does not allow the notification to be sent.

19. The method of claim 7, wherein:
- comparing a profile associated with the member to the received query to determine whether the profile satisfies the query comprises in response to the profile not satisfying the query determining whether the privacy policy associated with the member allows a notification to be sent to the querying service,
- in response to the privacy policy allowing a notification to be sent to the querying service, sending a notification to the querying service comprising an indication that the member does not have the desired relationship, and
- in response to the privacy policy prohibiting responding to any queries, determine that the privacy policy does not allow the notification to be sent.

* * * * *